(12) United States Patent
Weksler et al.

(10) Patent No.: US 9,936,385 B2
(45) Date of Patent: Apr. 3, 2018

(54) INITIAL ACCESS TO NETWORK THAT IS PERMITTED FROM WITHIN A THRESHOLD DISTANCE

(71) Applicant: Lenovo (Singapore) Pte. Ltd., New Tech Park (SG)

(72) Inventors: Arnold S. Weksler, Raleigh, NC (US); Nathan J. Peterson, Oxford, NC (US); John Carl Mese, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 33 days.

(21) Appl. No.: 14/959,278

(22) Filed: Dec. 4, 2015

(65) Prior Publication Data
US 2017/0164190 A1    Jun. 8, 2017

(51) Int. Cl.
*H04W 4/00*     (2009.01)
*H04W 12/06*    (2009.01)
*H04W 4/02*     (2018.01)
*H04W 72/04*    (2009.01)
*H04W 36/00*    (2009.01)

(52) U.S. Cl.
CPC .......... *H04W 12/06* (2013.01); *H04W 4/008* (2013.01); *H04W 4/021* (2013.01); *H04W 72/048* (2013.01); *H04W 72/0453* (2013.01)

(58) Field of Classification Search
CPC .......... H04M 1/7253; H04M 2250/02; H04W 88/06; H04W 12/06; H04W 4/008; H04W 4/021; H04W 72/0453; H04W 72/048

USPC ........................................................ 455/41.1
See application file for complete search history.

(56) References Cited

U.S. PATENT DOCUMENTS

| | | | |
|---|---|---|---|
| 2005/0079817 A1* | 4/2005 | Kotola .................... | G06Q 20/20 455/41.2 |
| 2009/0262716 A1* | 10/2009 | Kawakami ............ | H04W 48/20 370/338 |
| 2014/0127994 A1* | 5/2014 | Nightingale .......... | H04W 4/008 455/41.1 |
| 2014/0355057 A1* | 12/2014 | Jang .................... | G06K 7/10297 358/1.15 |
| 2015/0082408 A1* | 3/2015 | Yeh ...................... | G06F 19/3406 726/9 |
| 2017/0111759 A1* | 4/2017 | Ewing ................... | H04W 4/008 |

OTHER PUBLICATIONS

Chris Hoffman, "Wi-Fi Protected Setup (WPS) is Insecure: Here's Why You Should Disable It", How-To-Geek, Nov. 24, 2013. Retrieved from http://www.howtogeek.com/175124/wi-fi-protected-setup-wps-is-insecure-heres-why-you-should-disable-it/.

* cited by examiner

*Primary Examiner* — Huy C Ho
(74) *Attorney, Agent, or Firm* — John L. Rogitz; John M. Rogitz (57) ABSTRACT

In one aspect, a first device includes a processor, at least one wireless communication transceiver, and storage accessible to the processor. The storage bears instructions executable by the processor to operate a wireless network using the at least one wireless communication transceiver, permit a second device to initially access the wireless network based at least in part on the second device being within a threshold distance to the first device, and permit the second device to communicate with at least a third device through the wireless network from beyond the threshold distance.

20 Claims, 6 Drawing Sheets

INITIAL ACCESS TO NETWORK THAT IS PERMITTED FROM WITHIN A THRESHOLD DISTANCE

FIELD

The present application relates generally to initial access to a network.

BACKGROUND

As recognized herein, relatively longer range Wi-Fi routers are being placed into the marketplace. These routers permit access to a Wi-Fi network from a farther distance than previous routers. However, this increase in distance also comes with the increased potential that hackers may gain unauthorized access to the Wi-Fi network owing to the greater range of the Wi-Fi network and the hacker being thus being able to access the network, for example, from down the street from a house in which the router is disposed rather than from inside the house, as may have previously been the case with a shorter range Wi-Fi router.

SUMMARY

Accordingly, in one aspect a first device includes a processor, at least one wireless communication transceiver, and storage accessible to the processor. The storage bears instructions executable by the processor to operate a wireless network using the at least one wireless communication transceiver, permit a second device to initially access the wireless network based at least in part on the second device being within a threshold distance to the first device, and permit the second device to communicate with at least a third device through the wireless network from beyond the threshold distance.

In another aspect, a method includes authenticating a device using a first communication protocol for the device to access a wireless network, and permitting the device to communicate through the wireless network using a second communication protocol.

In still another aspect, an apparatus includes a first processor, a network adapter, and storage bearing instructions. The instructions are executable by a second processor for permitting a first device to initially access a wireless network based at least in part on the first device being within a threshold distance to a second device housing the second processor, and permitting the first device to communicate with at least a third device using the wireless network from beyond the threshold distance. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B. C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
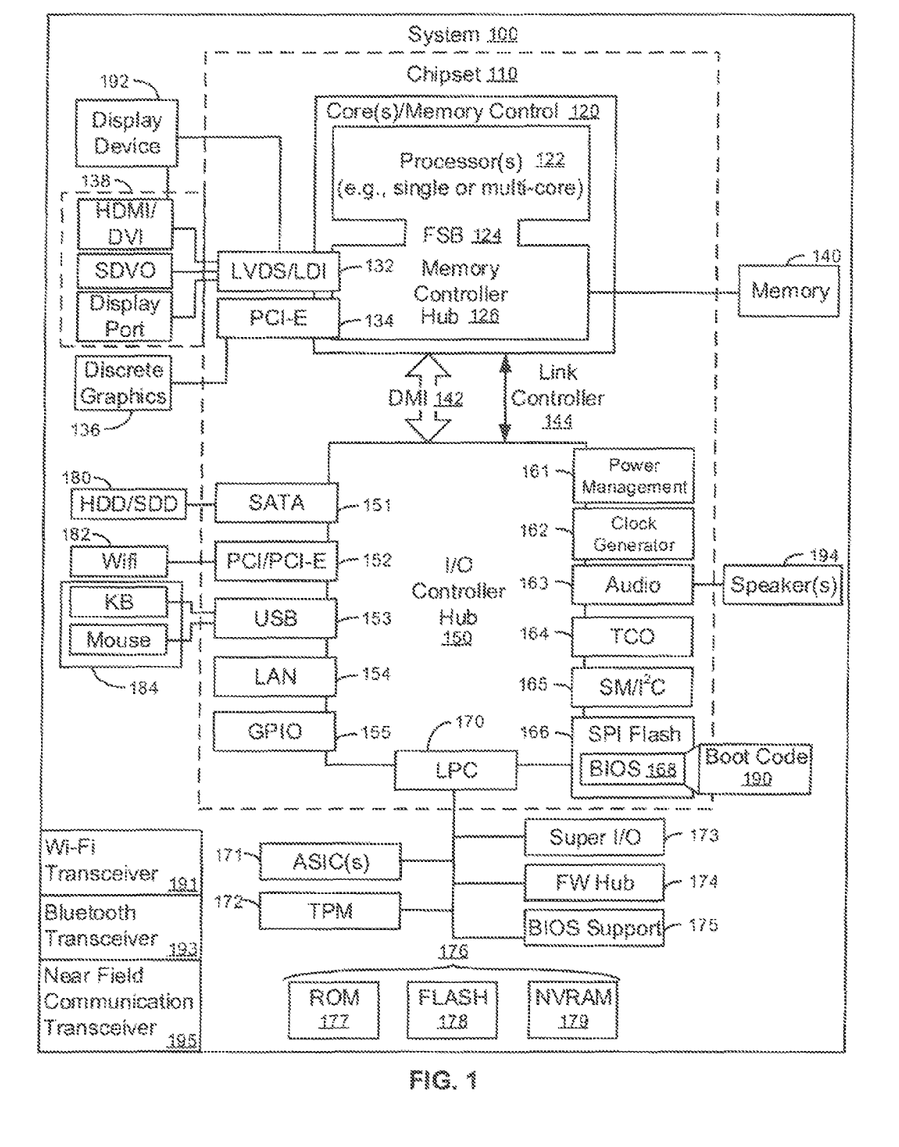
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller ISO can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM)

179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 1665, and thereafter processes data under the control of one or more operating systems and application software (e.g., stored in system memory 140). An operating system may be stored in any of a variety of locations and accessed, for example, according to instructions of the BIOS 168.

Furthermore, the system 100 may include a wireless local area network (WLAN) and/or Wi-Fi transceiver 191 for communicating with other devices in accordance with present principles using WLAN and/or Wi-Fi communication protocols. Also shown in FIG. 1 is a Bluetooth and/or Bluetooth low energy (BLE) communication element 193 (e.g., a Bluetooth 4.0 communication element) for communicating with other devices in accordance with present principles using Bluetooth communication protocols, and a near field communication (NFC) element 195 for communicating with other devices in accordance with present principles using NFC protocols.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
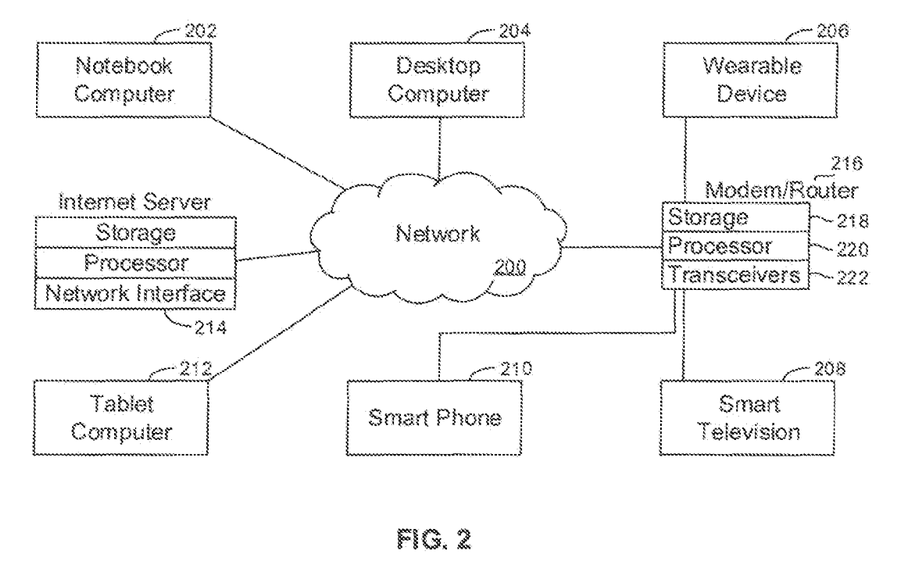
FIG. 2 is a block diagram of a network of devices in accordance with present principles.

Turning now to FIG. 2, example devices are shown communicating over a network 200 such as the Internet in accordance with present principles, with some devices accessing the network 200 through a modem and/or router 216. The modem and/or router 216 may house elements for operating a wireless network, permitting initial access to the wireless network, and facilitating communication of devices that have access to the wireless network with other devices outside the wireless network (such as the Internet server 214) in accordance with present principles. For example, the modem and/or router 216 may have storage 218, a processor 220, and one or more wireless transceivers 222 such as a Wi-Fi transceiver, a Bluetooth transceiver, and a near field communication (NFC) transceiver. The modem and/or router 216 may also have an interface for engagement with an Internet connection from an Internet service provider, which is then used to by the modem and/or router 216 to provide Internet access to devices within the wireless network it operates, such as the wearable device 206 (such as a smart watch), smart television 208, and smart phone 210 shown. Thus, the connection lines shown between the modem and/or router 216 and respectively the wearable device 206, smart television 208, and smart phone 210 are understood to represent wireless communication lines between those three devices and the modem and/or router 216 through the wireless network operated by the modem and/or router 216.

Note that FIG. 2 also shows a notebook computer and/or convertible computer 202, a desktop computer 204, a tablet computer 212, and a server 214 such as an Internet server that may provide cloud storage accessible to the devices 202-212. It is to be understood that the devices 202-216 are configured to communicate with each other over the network 200. It is to be further understood that each of the devices described in reference to FIG. 2 may include at least some of the features, components, and/or elements of the system 100 described above.

Figure 3:
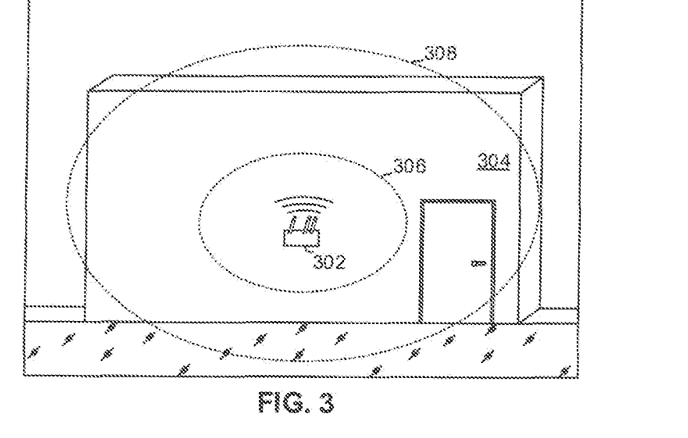
FIG. 3 is an example illustration in accordance with present principles.

Referring to FIG. 3, it shows an example illustration 300 in accordance with present principles. The illustration 300 shows a router 302 inside a building 304. A first threshold distance 306 from the router 302 is represented by perforated lines, while a second threshold distance 308 from the router 302 is also represented by perforated lines. The first threshold distance 306 is understood to represent a distance at and/or within which a user's device may be authenticated to initially access a Wi-Fi network in accordance with present principles, such as using Bluetooth communication, using NFC communication, using a first predefined frequency band that does not extend beyond the first threshold distance 306 such as, e.g., the 2.4 GHz radio frequency or the 5.0 GHz radio frequency band, etc. Then, once the device has been authenticated from within the first threshold distance 306 to initially access the Wi-Fi network, the device may, using a particular frequency band and/or communication protocol different from the one used to authenticate the device, continue to access the Wi-Fi network and/or later access the network again from within the second threshold distance 308 even if not within the first threshold distance 306.

Figure 4:
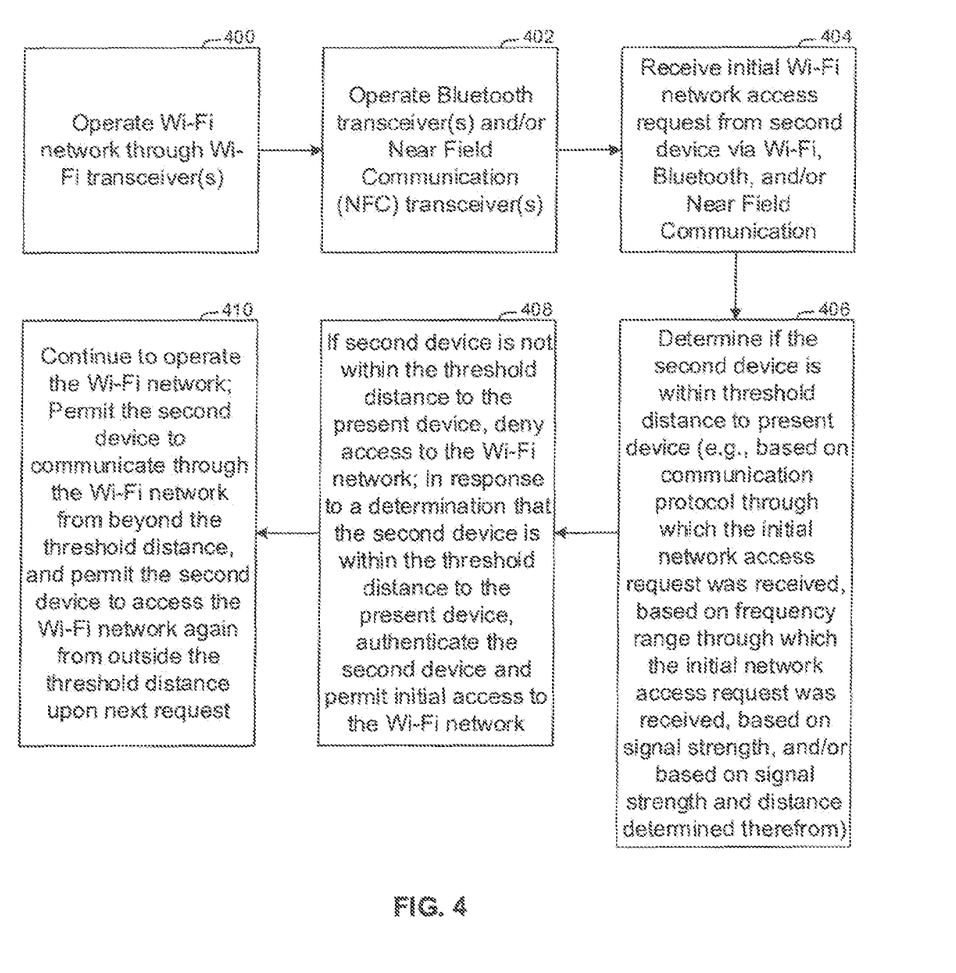
FIGS. 4 and 6 are flow charts showing example algorithms in accordance with present principles.

Now referring to FIG. 4, it shows example logic that may be executed by a device such as a router in accordance with present principles (referred to when describing FIG. 4 as the "present device"). Beginning at block 400, the logic operates a Wi-Fi network through one or more Wi-Fi transceivers on the present device so that end-user devices, such as a second device which may in example embodiments be a laptop computer or smart phone, may authenticate themselves using network access credentials (e.g., a personal identification number (PIN), a username, a password, an authentication key, etc.) to initially access the Wi-Fi network (e.g., for the first time ever for that second device, since authentication and/or registration information for the second device has been deleted at the router, and/or since network access information for accessing the wireless network has been deleted at the second device, etc.).

From block 400 the logic then proceeds to block 402, where the logic may operate one or more of a Bluetooth transceiver and/or a near field communication (NFC) transceiver at the present device, which may be used in some embodiments to authenticate the second device to then use the present device's Wi-Fi network. Then at block 404 the logic receives an initial request from the second device to access the Wi-Fi network via, for example, Wi-Fi communication in a predefined frequency band (such as the 2.4 GHz band or the 5.0 GHz band), Bluetooth communication, NFC communication, etc.

From block 404 the logic next proceeds to block 406, where in accordance with present principles the logic may determine if the second device is within a threshold distance to the first device, such as based on the strength (e.g., magnitude) of signals received from the second device, based on the second device communicating with the present device via the 2.4 GHz band or 5.0 GHz band, based on the second device communicating with the present device via Bluetooth communication, and/or based on the second device communicating with the present device via NFC. Notwithstanding, note that although such a determination may be made, in other embodiments it need not specifically be made and the logic may proceed directly from block 404 to block 408 if, for example, the threshold distance is defined by a maximum distance at which the present device and the second device can effectively and/or successfully communicate using the 2.4 GHz band or 5.0 GHz band, and/or if the threshold distance is defined by a maximum distance at which the present device and the second device can communicate using the protocol through which the initial request was received at block 404 such as a Bluetooth communication protocol and/or an NFC protocol.

In any case, from block 406 the logic proceeds to block 408. At block 408, if the second device is not within the threshold distance to the present device (e.g., as determined by the present device such as at least in part based on a determined strength of signals from the second device), the logic may deny the second device from accessing the Wi-Fi network. However, also at block 408, if the second device is within the threshold distance to the present device (e.g., as determined by the present device such as at least in part based on a determined strength of signals from the second device, and/or based on the predefined frequency and/or communication protocol being used for authentication), the logic may at least attempt to authenticate the second device as being permitted to access the Wi-Fi network and, responsive to successful authentication, permit the second device to initially access the Wi-Fi network. Thus, in embodiments where a determination is made at block 406, the logic at block 408 may at least attempt to authenticate the device in response to the determination that the second device is within the threshold distance, whereas in embodiments where no such determination is made but where the initial request was received via at least one of the predefined frequency ranges and/or communication protocols discussed above, the logic at block 408 may at least attempt to authenticate the device in response to receiving the initial request itself via one of the predefined frequency ranges and/or communication protocols.

FIG. 4 also shows that from block 408 the logic may proceed to block 410. At block 410 the logic continues to operate the Wi-Fi network so that one or more authenticated devices may communicate with other devices through it. Also at block 410, the logic, in response to successful authentication of the second device to use the Wi-Fi network at block 408, permits the second device to communicate through the Wi-Fi network from beyond the threshold distance (e.g., using another frequency band where Wi-Fi signals travel relatively longer). Also at block 410, the logic may permit the second device to again access the Wi-Fi network (e.g., from beyond the threshold distance) upon another request for access after disconnection to the Wi-Fi network subsequent to the initial access.

Figure 5:
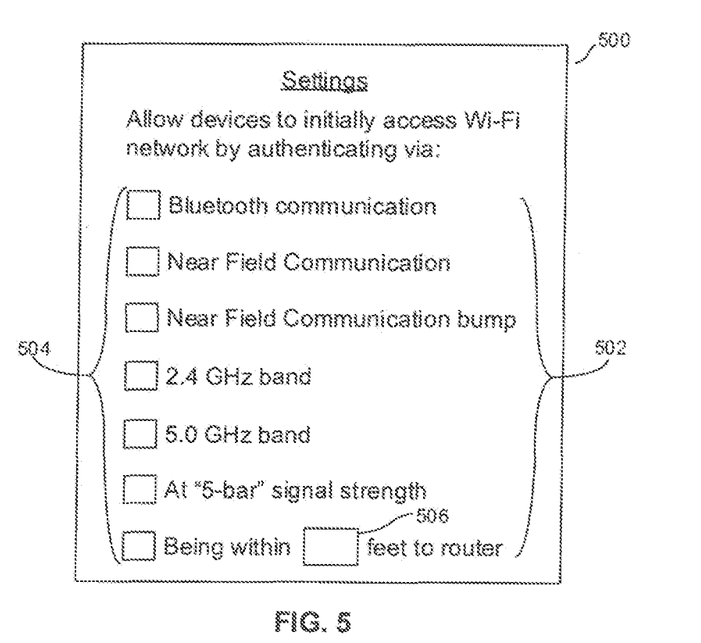
FIGS. 5 and 7 are example user interfaces (UIs) in accordance with present principles.

Continuing the detailed description in reference to FIG. 5, it shows an example user interface (UI) 500 that may be presentable on a display of a device executing the logic discussed above in reference to FIG. 4 and/or on a display of a device otherwise having access to a device executing the logic discussed above in reference to FIG. 4. Thus, the UI 500 may be accessible to a user, network administrator, etc. to configure settings for a router in accordance with present principles.

The UI 500 includes options 502 that are respectively selectable using the respective check boxes 504 shown adjacent to each option 502. Each of the options 502 is selectable to automatically without further user input allow devices to authenticate themselves to initially access a Wi-Fi network operated by the router via, respectively, Bluetooth communication as described herein, NFC as described herein. NFC bumping as described herein, 2.4 GHz band communication as described herein, 5.0 GHz band communication as described herein, a particular level of signal strength as described herein (e.g., so-called "five-bar" signal strength), and/or being within a threshold distance to the router. Note that for the last one regarding being within a threshold distance to the router, a number entry box 506 is shown and a user may direct input to the box 506 to establish a particular distance as the threshold distance to be used in accordance with present principles.

Before moving on to the description of other figures, NFC bump communication in accordance with present principles will be further described. It is to be understood that in at least some instances, it may be desirable to authenticate a device to initially access a Wi-Fi network in accordance with present principles based on physical contact of a user's device with the router itself, and/or a device associated with and connected to the router. Accordingly, in some embodiments, NFC "bumping", "beaming", and/or "touch-to-share" may be used, where in response to physical contact of two devices (each having NFC elements) with each other, information may be exchanged via NFC (e.g., including the authentication information). In addition to or in lieu of the foregoing, subsequent to and based on the exchange of connection information via NFC bump, the devices may establish direct Bluetooth and/or Wi-Fi direct communication for the user's device to provide the authentication credentials to the router. It is to be further understood that while NFC bumping has been referenced above, present principles may apply for other types of bump communication as well, such as Bluetooth bumping.

Now describing signal strength in more detail, it is to be understood that distance may be determined based on the strength of signals (e.g., Bluetooth signals, Wi-Fi signals, etc.) received from a user's device. More particularly, received signal strength identification (RSSI) principles, algorithms, and methods may be used to identify a strength of at least one received signal and correlate the strength to distance to thus identify a distance based on identified signal strength (e.g., by accessing a data table correlating various signal strengths respectively to distances). In example embodiments, the correlation is based on signals being weaker from relatively more distant devices than from closer devices.

Figure 6:
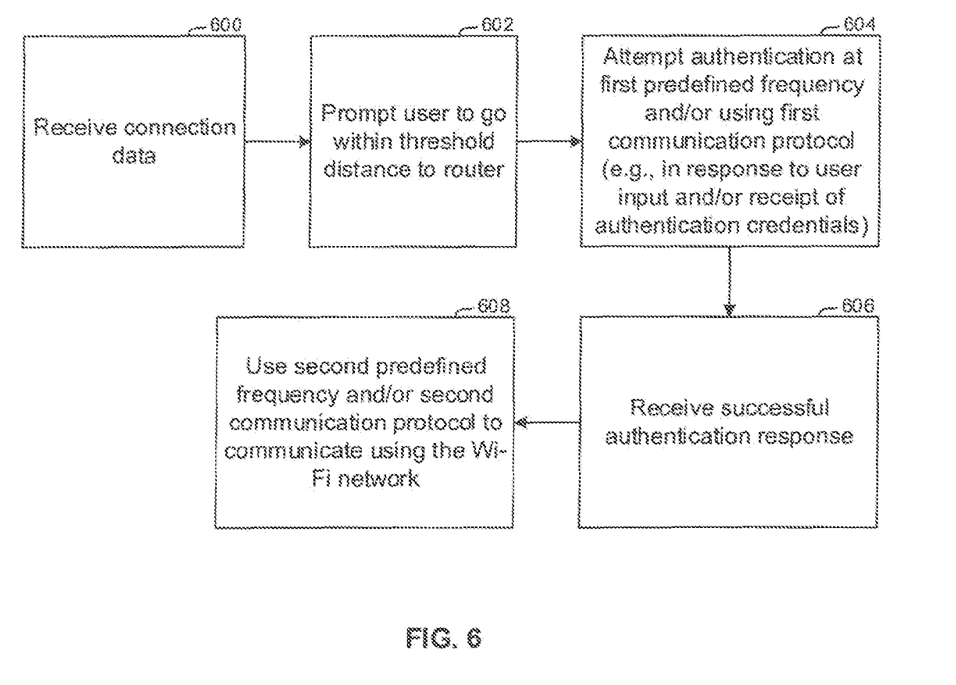

Now in reference to FIG. 6, it shows example logic that may be undertaken by an end-user device (referred to when describing FIG. 6 as the "present device") seeking to authenticate itself and begin communicating through a wireless network in accordance with present principles. The present device receives/determines connection data at block 600, such as based on user input providing the connection data, based on publically available signals being broadcasted by a router at least in part operating the wireless network, and/or based on data stored at the present device. The connection data may comprise information for initially accessing the wireless network, including identification information for the present device (e.g., a MAC address), a name of the network, and authentication information such as a username, a password, other authentication credentials, etc.

From block 602 the logic proceeds to block 602. At block 602 the logic prompts the user to place the present device at or within a threshold distance to the router identified in the prompt. The prompt may be presented, e.g., only responsive to the present device first determining that the present device is not at or within the threshold distance, and/or may be presented by default regardless of the present device already being at or within the threshold distance. In any case, from block 602 the logic next proceeds to block 604, where, from within the threshold distance, the logic attempts authentication so that it may communicate through the wireless network. The present device may attempt authentication by communicating with the router using a first predefined frequency band (e.g., the 2.4 GHz Wi-Fi band), using a first predefined communication protocol such as Bluetooth, etc. to provide the authentication information received at block 600 and/or other data. Furthermore, note that the logic may do so at block 604 in response to receipt of user input to authenticate the present device and/or in response to receipt of the authentication credentials themselves.

After block 604, the logic proceeds to block 606 where, based on successful authentication of the present device at the router, the logic receives back from the router a response indicating successful authentication. The logic then proceeds to block 608 where the logic uses a second predefined frequency band and/or second communication protocol to communicate with other devices through the Wi-Fi network, such as a predefined frequency band in which Wi-Fi signals travel farther than in the first predefined frequency band used at block 604 so that a user may continue to use the Wi-Fi network even if the present device is taken beyond the threshold distance.

Figure 7:
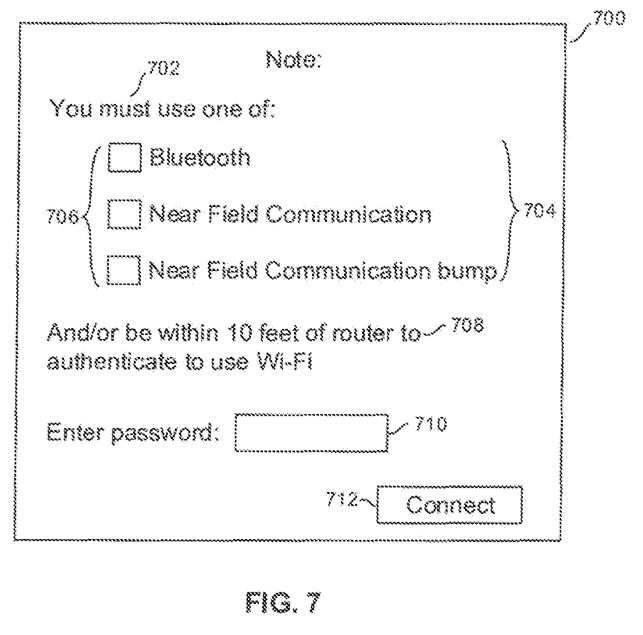

Moving on, reference is now made to FIG. 7. FIG. 7 shows a user interface (UI) 700 presentable on a display of a device undertaking the logic of FIG. 6. The UI 700 includes an indication 702 that a predefined communication protocol should be used to authenticate the device so that it may initially access a wireless network. The indication 702 is accompanied by one or more options 704 listing one or more predefined protocols that may be used, where the options 704 are selectable using the respective check boxes 706 shown to enable communication using the associated communication protocol listed for that option. Thus, as may be appreciated from FIG. 7, the communication protocols listed in this example are Bluetooth communication protocols, NFC protocols, and NFC bump protocols.

In addition to or in lieu of the indication 702 and/or options 704, the UI 700 may include an indication 708 that the device is to be placed at or within a threshold distance to the router identified in the indication 708 (which in this example is ten feet) to authenticate the device so that it may use the Wi-Fi network to which it seeks to connect. Also in some embodiments, the UI 700 may include a password entry field 710 at which a user may enter a password used to authenticate the device and/or to access the Wi-Fi network. A connect selector 712 is also shown which is selectable to automatically without further user input at least attempt to, for example, authenticate the device using the selected predefined communication protocol from within the threshold distance using a password entered to box 710.

Generally but still in accordance with present principles, it is to be understood that a device executing the logic of FIG. 4 and/or other actions taken by a router in accordance with present principles may be a stand-alone router, a modem/router combination, or another computing device with router components that operates a wireless network. Furthermore, note that some or all instructions for executing what is disclosed in reference to FIG. 4 may be stored in the router's storage at manufacture, but they may also be installed at the router after vending as part of a firmware update to the router.

Furthermore, it is to be understood that still other ways of determining device location may be used in accordance with present principles. For instance, RFID tag and communication may be used, as may laser rangefinders, communication of GPS coordinates, and line of sight image analysis (to determine if a user's device is within a line of sight to the router based on images gathered at the router to then at least attempt authenticate the device if in a line of sight to the router).

It may now be appreciated that present principles provide for allowing devices with credentials that have been authenticated using, e.g., a short-distance radio on the router to access a wireless network operated by the router. Thus, such as device is to be authenticated in relatively close proximity to the router before the router allows the device to connect to the wireless network via, e.g., a longer-distance radio.

If a router in accordance with present principles has but one radio, a device seeking to access the wireless network may be initially authenticated through the single radio from relatively close to the device before a user can use the device to access the wireless network from farther away from the router. For example, in one embodiment the router may identify a strength of signals from the device as having five-bar Wi-Fi strength in order to permit and/or perform authentication of the user's device.

Present principles may be used by, for example, businesses to allow customers to access a Wi-Fi network. E.g., if a customer at a coffee shop wants to connect to the coffee shop's Wi-Fi network, the customer could purchase a one-hour network access pass. After the user pays at the counter and receives Wi-Fi network logon credentials (such as a password), the user may enter credentials at the device and have his or her device authenticated from within the coffee shop. The customer would then be free to travel within the range of the network, even if beyond the coffee shop itself. The router may track devices by, e.g., MAC address in order to continue to permit the devices to access the Wi-Fi network.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular INITIAL ACCESS TO NETWORK THAT IS PERMITTED FROM WITHIN A THRESHOLD) DISTANCE is herein shown and described in detail, it is to be understood that the subject matter which is encompassed by the present application is limited only by the claims.

What is claimed is:

1. A first device, comprising:
a processor;
at least one wireless communication transceiver; and
storage accessible to the processor and comprising instructions executable by the processor to:
operate a Wi-Fi wireless network using the at least one wireless communication transceiver;
permit a second device to access the Wi-Fi wireless network based at least in part on the second device being within a threshold distance to the first device;
permit the second device to communicate with at least a third device through the Wi-Fi wireless network from beyond the threshold distance; and
present a user interface (UI) including at least first and second options, the first option being selectable to permit the second device to access the Wi-Fi wireless network based at least in part on the second device being within a threshold distance to the first device as determined using a first short range wireless protocol, the second option being selectable to permit the second device to access the Wi-Fi wireless network based at least in part on the second device being within a threshold distance to the first device as determined using a second short range wireless protocol, neither short range wireless protocol being Wi-Fi.

2. The first device of claim 1, wherein the instructions are executable by the processor to:
permit the second device to initially access the Wi-Fi wireless network at least in part by authenticating information from the second device received at the first device.

3. The first device of claim 1, wherein the UI comprises at least one of:
a signal strength selector selectable to establish a signal strength indicated on the UI to thereby establish the threshold distance;
a field into which a number can be entered to establish the threshold distance.

4. The first device of claim 1, wherein the instructions are executable by the processor to:
permit the second device to initially access the Wi-Fi wireless network based at least in part on the second device being within the threshold distance to the first device as determined by the first device.

5. The first device of claim 4, wherein the instructions are executable by the processor to:
determine that the second device is within the threshold distance to the first device at least in part based on an identification of strength of signals received from the second device.

6. The first device of claim 4, wherein the instructions are executable by the processor to:
determine that the second device is within the threshold distance to the first device at least in part based on an identification of strength of signals received from the second device, and based at least in part on an identification of the second device being within the threshold distance based on the strength of signals received from the second device.

7. The first device of claim 1, wherein the threshold distance is defined by a maximum distance at which the first device and the second device can communicate using a predefined frequency range, the predefined frequency range being used to authenticate the second device to permit the second device to initially access the Wi-Fi wireless network.

8. The first device of claim 7, wherein the predefined frequency range is the two and four tenths gigahertz (GHz) band.

9. The first device of claim 7, wherein the predefined frequency range is the five gigahertz (GHz) band.

10. The first device of claim 1, wherein the threshold distance is defined by a maximum distance at which the first device and the second device can communicate using a first communication protocol different from a second communication protocol used to permit the second device to communicate with at least the third device through the Wi-Fi wireless network from beyond the threshold distance, the first communication protocol being used to authenticate the second device to permit the second device to initially access the Wi-Fi wireless network.

11. The first device of claim 10, wherein the first communication protocol is selected from the group consisting of: a Bluetooth communication protocol, a near field communication (NFC) protocol.

12. The first device of claim 10, wherein the first communication protocol is a near field communication (NFC) bump protocol.

13. The first device of claim 1, wherein the first device comprises a router.

14. A method, comprising:
operating, via a first device, a Wi-Fi wireless network using at least one wireless communication transceiver;
permitting a second device to access the Wi-Fi wireless network based at least in part on the second device being within a threshold distance to the first device;
permitting the second device to communicate with at least a third device through the Wi-Fi wireless network from beyond the threshold distance; and
presenting a user interface (UI) including at least first and second options, the first option being selectable to permit the second device to access the Wi-Fi wireless network based at least in part on the second device being within a threshold distance to the first device as determined using a first short range wireless protocol, the second option being selectable to permit the second device to access the Wi-Fi wireless network based at least in part on the second device being within a threshold distance to the first device as determined using a second short range wireless protocol, neither short range wireless protocol being Wi-Fi.

15. The method of claim 14, wherein the UI comprises at least one of:
a signal strength selector selectable to establish a signal strength indicated on the UI to thereby establish the threshold distance;
a field into which a number can be entered to establish the threshold distance.

16. The method of claim 14, comprising:
determining that the second device is within the threshold distance to the first device at least in part based on an identification of strength of signals received from the second device.

17. The method of claim 14, wherein the UI comprises a message that the first device is to be placed at or within a threshold distance to an access point associated with the wireless network to authenticate the first device to the wireless network.

18. A computer readable storage medium (CRSM) that is not a transitory signal, the computer readable storage medium comprising instructions executable by at least one processor to:

operate, via a first device, a Wi-Fi wireless network using at least one wireless communication transceiver;

permit a second device to access the Wi-Fi wireless network based at least in part on the second device being within a threshold distance to the first device;

permit the second device to communicate with at least a third device through the Wi-Fi wireless network from beyond the threshold distance; and present a user interface (UI) including at least first and second options, the first option being selectable to permit the second device to access the Wi-Fi wireless network based at least in part on the second device being within a threshold distance to the first device as determined using a first short range wireless protocol, the second option being selectable to permit the second device to access the Wi-Fi wireless network based at least in part on the second device being within a threshold distance to the first device as determined using a second short range wireless protocol, neither short range wireless protocol being Wi-Fi.

19. The CRSM of claim 18, wherein the first short range wireless protocol is a near field communication (NFC) bump protocol.

20. The CRSM of claim 18, wherein the instructions are executable by the at least one processor to:

determine that the second device is within the threshold distance to the first device at least in part based on an identification of strength of signals received from the second device.

* * * * *